E. J. VRAALSTAD.
FEEDER FOR THRESHING MACHINES.
APPLICATION FILED DEC. 7, 1907.

1,041,205.

Patented Oct. 15, 1912.
2 SHEETS—SHEET 1.

E. J. VRAALSTAD.
FEEDER FOR THRESHING MACHINES.
APPLICATION FILED DEC. 7, 1907.
1,041,205.
Patented Oct. 15, 1912.
2 SHEETS—SHEET 2.
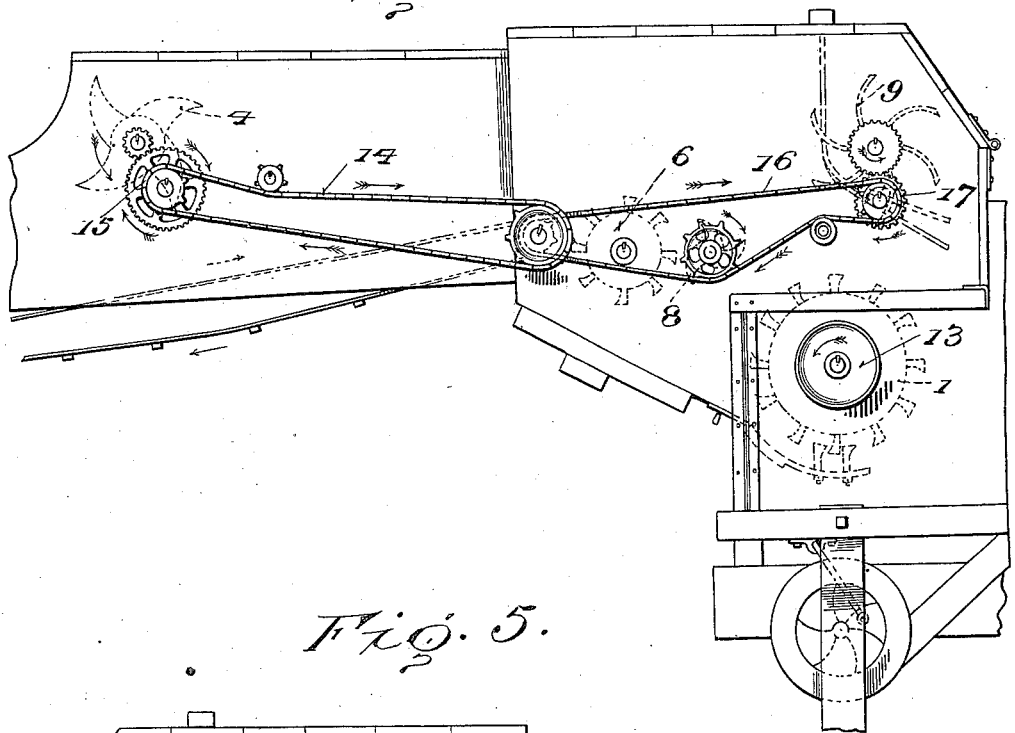
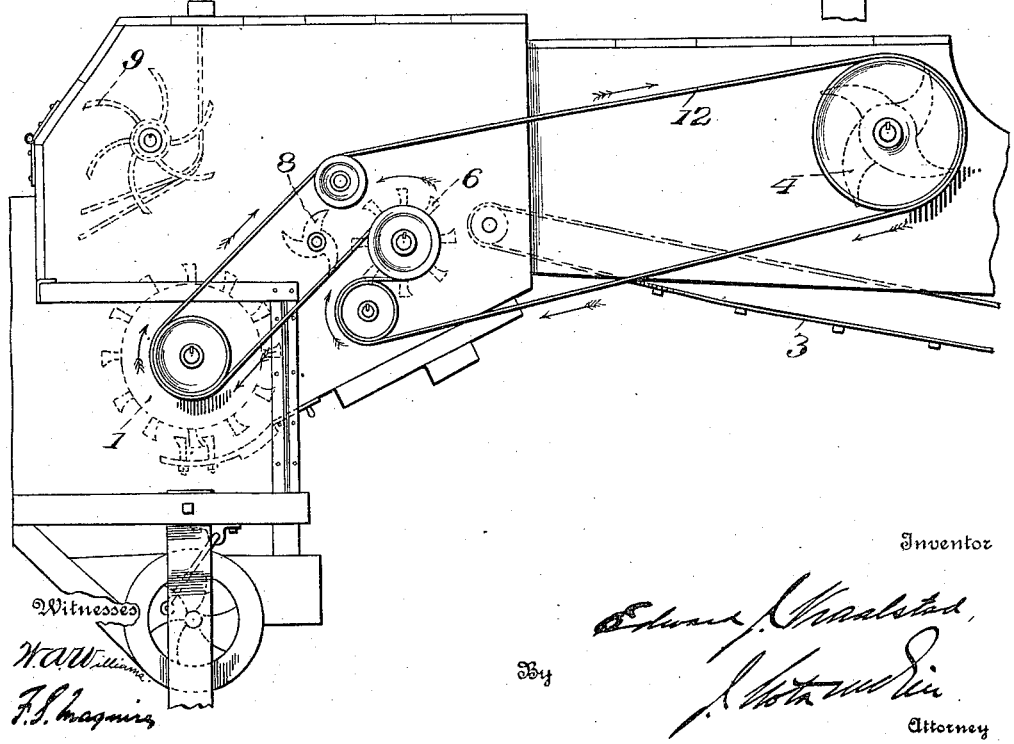

UNITED STATES PATENT OFFICE.

EDWARD J. VRAALSTAD, OF BUFFALO, NEW YORK, ASSIGNOR OF ONE-HALF TO BUFFALO PITTS COMPANY, OF BUFFALO, NEW YORK, A CORPORATION OF NEW YORK.

FEEDER FOR THRESHING-MACHINES.

1,041,205. Specification of Letters Patent. Patented Oct. 15, 1912.

Application filed December 7, 1907. Serial No. 405,598.

*To all whom it may concern:*

Be it known that I, EDWARD J. VRAALSTAD, of Buffalo, in the county of Erie and State of New York, have invented certain new and useful Improvements in Feeders for Threshing-Machines; and I do hereby declare the following to be a full, clear, and exact description of the invention, such as will enable others skilled in the art to which it appertains to make and use the same.

The object of this invention is to increase the efficiency of threshing machines by enabling them to more thoroughly and effectively act upon the grain. This I accomplish by so feeding the straw to the threshing cylinder that the grain will be above the straw of grain previously acted upon, instead of below such straw as has heretofore been customary.

The invention will be hereinafter fully set forth and particularly pointed out in the claims.

Figure 1:
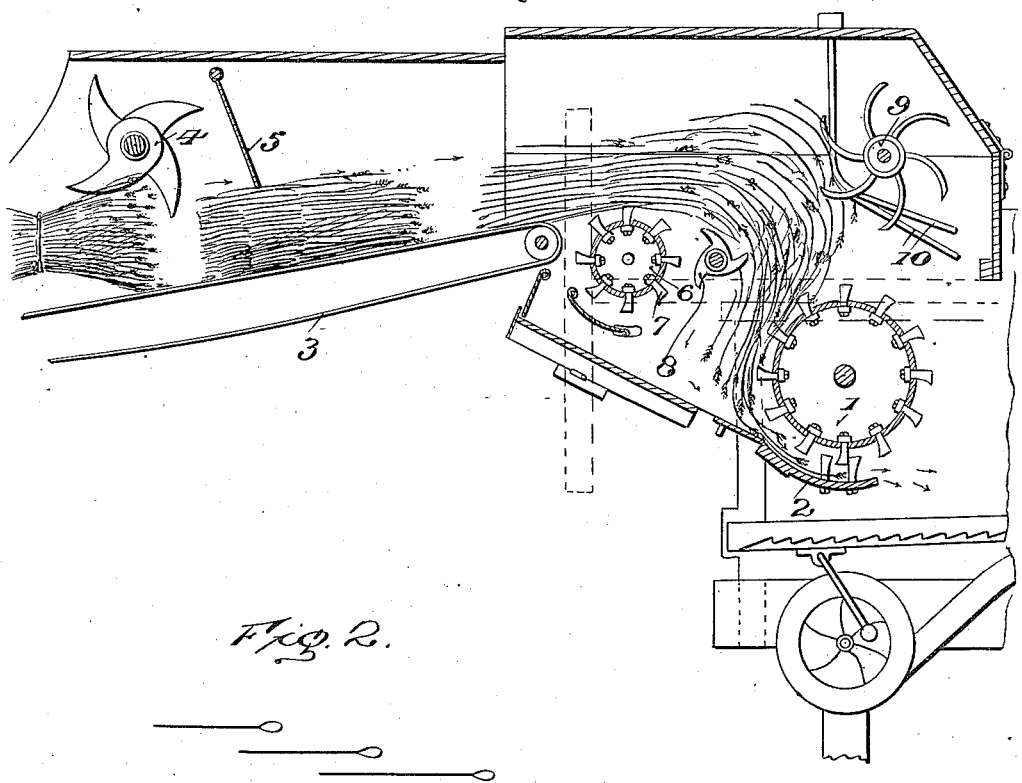
Figure 2:
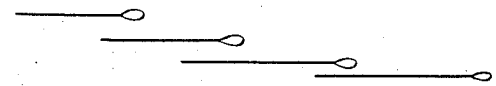
Figure 3:
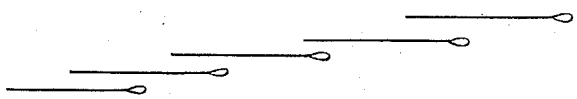

In the accompanying drawings, Figure 1 is a view of the feeding end of a threshing machine, with parts broken away and others in section. Figs. 2 and 3 are diagrammatic views, the former showing the relative positions of several pieces of straw and grain when fed in accordance with my invention, while the other view shows the straw when the feeding is from the tops of the bundles. Figs. 4 and 5 are views from opposite sides of the machine, showing the operating means.

Referring to the drawings, 1 designates the threshing cylinder, 2 the concave, 3 the endless feeding carrier, 4 the band cutter to which the bundles are carried by the carrier, and 5 a retarder for keeping the straw of each bundle in proper position while being acted upon by the band-cutter. All of these parts may be of the ordinary or any preferred form of construction. But in practising my invention best results are obtained if the band cutter and feeder be revolved at a speed of about five hundred revolutions per minute.

6 designates a stripping cylinder having teeth 7 which in their travel just about intersect the bottom of the plane of the line of entrance of the straw to the feeding end of the machine, that is to say, after the straw leaves the carrier. This stripping cylinder is rotated at a high rate of speed, say about sixteen hundred revolutions, and is revolved in the opposite direction to the threshing cylinder, as shown by the respective arrows on the two cylinders. It is located in proximity to the inner end of the carrier and preferably in front of and some distance above the threshing cylinder and considerably to one side of the plane of the teeth thereof, being nearer to the discharging end of the carrier than to the threshing cylinder. Immediately adjacent this stripping cylinder is a retarder 8, the arms or teeth of which preferably intersect the line of travel of the teeth of the stripping cylinder. It is located on about the same horizontal plane as the latter and is revolved in the same direction, but at a very much slower speed, say about thirty-five revolutions to the minute.

9 is a deflector which, to a certain extent, acts as a feeder. It is shown in the form of circularly-arranged beater-arms carried by a shaft journaled in the upper part of the casing above the threshing cylinder and the retarder 8. It is revolved in the opposite direction to the stripping cylinder 6 and retarder 8, but its speed is approximately the same as that of the latter. Between its arms extend guiding fingers 10, which act as guards.

Any suitable means may be employed for operating the parts and maintaining the necessary relative speeds. In Fig. 5 I have shown a belt 12 for operating the stripping cylinder 6 and band cutter 4, such belt being driven from the threshing cylinder shaft, which at the other side of the machine carries a band-wheel 13 for the driving belt (not shown). The carrier 3 is driven by a belt 14 which is actuated, through reverse gearing 15, by the cutter 4. The retarder 8 is driven by a band 16 from carrier 3, which band, through reverse gearing 17, operates deflector 9.

In practice, no retarder is employed to act on the grain in opposition to the stripper. The rapid revolution of the latter serves to draw out the grain from the bottom of the loose mass, the top remaining practically inert until it in turn is reached and acted upon by the stripper. The grain delivered by the rapidly revolving stripper is arrested by the upper forward deflector 9, the movement of which serves to force the grain downward toward the threshing cylinder. The slowly-moving retarder 8 causes the grain to be evenly fed to the threshing cylinder. If the grain should be bunched it will be held back by the retarder and gradually taken up by the threshing cylinder. In consequence of feeding from the bottom the grain is presented directly to the teeth of the threshing cylinder above the straw of the previously threshed grain. This will be better understood by the diagrammatic showing of Fig. 2. It will be observed that the grain of each succeeding straw is above the straw of the preceding grain, whereas when the feeding is from the top of the bundle, the grain of each succeeding straw is beneath the straw of the preceding grain, as shown in Fig. 3. This makes it necessary for the teeth of the threshing cylinder to project through the straw before it reaches the grain, whereas by my invention the grain being above is instantly acted upon by the threshing cylinder.

The advantages of my invention will be apparent to those skilled in the art. It will be seen that without adding in the least to the cost of construction or operation I am enabled to so present the straw to the threshing cylinder that the grain may be readily and effectively separated, it not being necessary for the cylinder teeth to plow through the straw in order to reach the grain, the latter being on top. By the rapid revolution of the stripper the grain is fed from the loose mass without the use of a counteracting retarder and is presented to the threshing cylinder in a loose state.

I claim as my invention:

1. Means for feeding grain to a threshing machine comprising, in combination with a casing, a carrier, a rapidly revolving stripping cylinder located forward of and beneath the plane of the carrier with its effective periphery approximately in line with such plane of the carrier, said carrier and cylinder having above them and within the casing a free open space, means for rapidly operating such cylinder to strip the grain from the bottom of a loose mass thereof, the top or upper portion of such mass remaining relatively inert until engaged by the stripping cylinder, a slow moving retarder immediately forward of the stripping-cylinder and between the latter and the threshing cylinder, and means for operating said retarder.

2. Means for feeding grain to a threshing machine comprising, in combination with a casing, a carrier, a rapidly revolving stripping cylinder located forward of and beneath the plane of the carrier, with its effective periphery approximately in line with such plane of the carrier, said carrier and cylinder having above them and within the casing a free open space, means for rapidly operating such cylinder to strip the grain from the bottom of a loose mass thereof, the top or upper portion of such mass remaining relatively inert until engaged by the stripping cylinder, a threshing cylinder, a slow-moving deflector for directing the grain toward the threshing cylinder after leaving the stripping cylinder, a slow-moving retarder immediately forward of the stripping cylinder and between the latter and the threshing cylinder, and means for operating said deflector and retarder.

In testimony whereof, I have signed this specification in the presence of two subscribing witnesses.

EDWARD J. VRAALSTAD.

Witnesses:
J. NOTA McGILL,
FRANCIS S. MAGUIRE.